United States Patent
Ellul et al.

(10) Patent No.: US 8,670,242 B2
(45) Date of Patent: Mar. 11, 2014

(54) DATA STORAGE DEVICES

(75) Inventors: Peter Anthony Ronald Ellul, London (GB); Stephen James Brown, Dorset (GB)

(73) Assignee: Goosewire Holdings Limited, London (GB)

( * ) Notice: Subject to any disclaimer, the term of this patent is extended or adjusted under 35 U.S.C. 154(b) by 446 days.

(21) Appl. No.: 13/054,308

(22) PCT Filed: Jul. 14, 2009

(86) PCT No.: PCT/GB2009/001738
§ 371 (c)(1),
(2), (4) Date: Apr. 14, 2011

(87) PCT Pub. No.: WO2010/007359
PCT Pub. Date: Jan. 21, 2010

(65) Prior Publication Data
US 2011/0182040 A1 Jul. 28, 2011

(30) Foreign Application Priority Data
Jul. 14, 2008 (GB) .................................. 0812843.1

(51) Int. Cl.
*H05K 1/14* (2006.01)
(52) U.S. Cl.
USPC .......................................... 361/737; 361/728
(58) Field of Classification Search
USPC .......................................... 361/737, 728–730
See application file for complete search history.

(56) References Cited

U.S. PATENT DOCUMENTS

| 6,883,718 | B1 | 4/2005 | Le et al. | |
|---|---|---|---|---|
| 7,097,108 | B2 * | 8/2006 | Zellner et al. | 235/492 |
| 7,344,072 | B2 * | 3/2008 | Gonzalez et al. | 235/441 |
| D626,651 | S * | 11/2010 | Brauer et al. | D24/169 |
| 8,302,872 | B2 * | 11/2012 | Mullen | 235/493 |
| 2007/0017969 | A1 | 1/2007 | Wilson | |
| 2007/0152683 | A1 * | 7/2007 | Werner et al. | 324/693 |
| 2007/0233395 | A1 * | 10/2007 | Neel et al. | 702/19 |
| 2007/0252010 | A1 | 11/2007 | Gonzalez et al. | |
| 2008/0314994 | A1 * | 12/2008 | Faith et al. | 235/493 |
| 2009/0304547 | A1 * | 12/2009 | Werner et al. | 422/55 |
| 2009/0305317 | A1 * | 12/2009 | Brauer et al. | 435/14 |

FOREIGN PATENT DOCUMENTS

WO   WO-2006/085300 A2   8/2006

OTHER PUBLICATIONS

Grob, Mark, "International Search Report", for PCT/GB2009/001738 as mailed Mar. 31, 2010, 6 pages.

* cited by examiner

*Primary Examiner* — Hung S Bui
(74) *Attorney, Agent, or Firm* — Winstead PC

(57) ABSTRACT

A data storage device comprising a card-shaped body, a memory within the card-shaped body, and a connector for connecting the memory to a personal computer. The card-shaped body comprises a swipable portion with a magnetic stripe arranged to be read by a magnetic stripe card reader. The card-shaped body can comprise a main portion with a recess and a connector portion comprising the memory and connector. In that case, the connector portion is hingably mounted on the main portion to be rotatable between a closed position in which the connector portion is located within the recess, and an open position in which the connector of the connector portion is located outside of the recess so that it can be used to connect the memory to a personal computer.

17 Claims, 9 Drawing Sheets

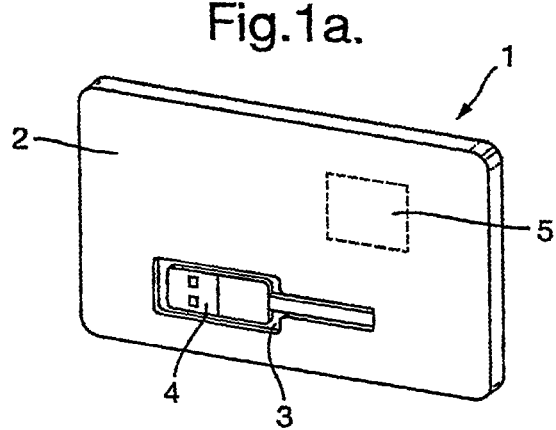
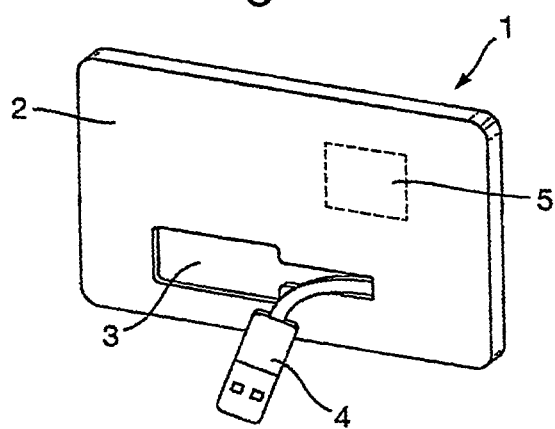
PRIOR ART

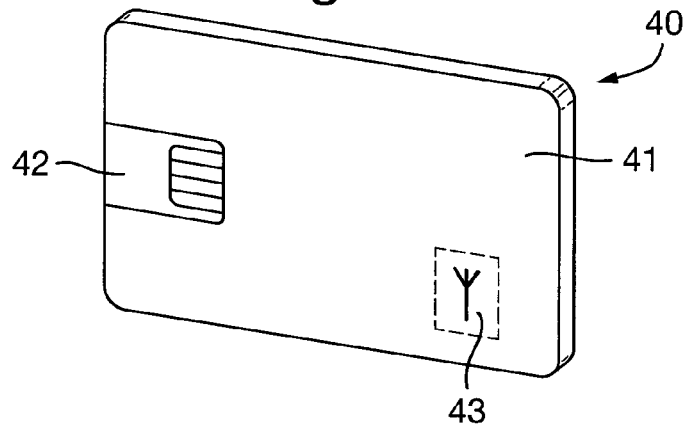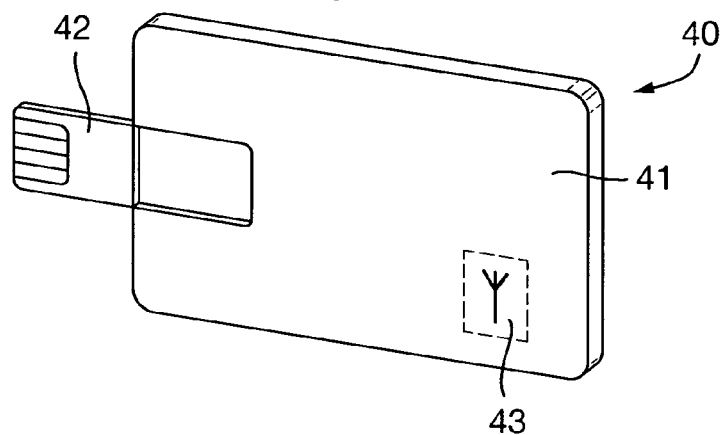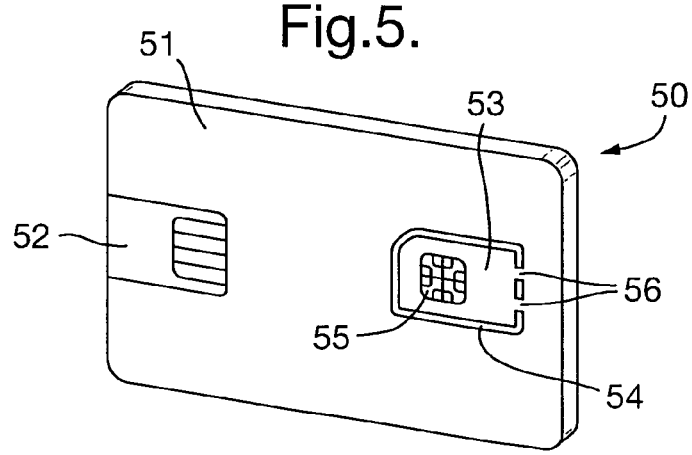

DATA STORAGE DEVICES

The present invention relates to data storage devices.

Portable data storage devices using non-volatile memory, such as "flash" memory, are well known, and are commonly used for storing data and (for example) transferring the data between personal computers. One popular device is the "USB stick", which comprises a flash memory with a universal serial bus (USB) connector contained in a single small package, which is of a size that it can be used for example as a keyring.

A recent development is the "USB card", an example of which is shown in FIGS. 1a and 1b. The card 1 comprises a card-shaped body 2, with a recess 3. A USB connector 4 disposed within the recess 3 is connected to flash memory 5 within the card-shaped body 2. As shown in FIG. 1b, the USB connecter 4 can be removed from the recess 3 for connection to a USB port, allowing a personal computer (for example) to access the flash memory 4.

The faces of the card-shaped body 2 have the dimensions of a standard bank card (such as a credit card, debit card, store card or similar). However, the card is necessarily thicker than a standard bank card, to allow space for the flash memory 4 and the USB connector 5.

Another example of a USB card is shown in FIGS. 2a and 2b. The card 10 comprises a card-shaped body 11, one edge of which has a recess 14 (see FIG. 2b) containing a USB connector 13 connected to flash memory 15 within the card-shaped body 11. The connector 13 can be slid between a closed position in which no part of the connector 13 extends beyond the edge of the card-shaped body 11 (see FIG. 2a), and an open position in which the connector 13 extends beyond the edge of the card-shaped body 11 so that it can be connected to a USB port (see FIG. 2b).

As in the previous example, the faces of the card-shaped body 11 have the dimensions of a standard bank card, but the card is necessarily thicker than a standard bank card, to allow space for the flash memory 15 and the USB connector 13.

The physical properties of standard bank cards, including their size, flexibility, location of the "magstripe" (a magnetic stripe as described in more detail below), and magnetic characteristics, are defined by a number of International Organization for Standardization standards such as ISO 7810, ISO 7811, ISO 7812, ISO 7813, and ISO 4909. They also provide the standards for financial cards, including the allocation of card number ranges to different card issuing institutions.

The "magstripe" or magnetic stripe is a band of magnetic material on the card, on which data can be stored by modifying the magnetism of tiny iron-based magnetic particles in the stripe. The magnetic stripe is read by physical contact and swiping past a reading head. Magnetic stripe cards are commonly used in credit cards, identity cards, and transportation tickets. In most magnetic stripe cards, the magnetic stripe is contained in a plastic-like film. The magnetic stripe is located 0.223 inches (5.66 mm) from the edge of the card, and is 0.375 inches (9.52 mm) wide. The magnetic stripe contains three tracks, each 0.110 inches (2.79 mm) wide. Tracks one and three are typically recorded at 210 bits per inch (8.27 bits per mm), while track two typically has a recording density of 75 bits per inch (2.95 bits per mm). Each track can either contain 7-bit alphanumeric characters, or 5-bit numeric characters.

Magnetic stripe cards following these specifications can typically be read by most point-of-sale hardware, which are simply generic general-purpose computers that can be programmed to perform specific tasks. Examples of cards adhering to these standards include ATM cards, bank cards (credit and debit cards including VISA and MasterCard), gift cards, loyalty cards, driver's licenses, telephone calling cards, membership cards.

The standard dimensions for such cards are 85.6 mm by 54 mm by 0.76 mm. Cards may be made for example from laminated PVC.

In accordance with the present invention there is provided a data storage device comprising: a card-shaped body, a memory within the card-shaped body, a connector for connecting the memory to a personal computer, wherein the card-shaped body comprises a subscriber identity module (SIM).

The card-shaped body may have dimensions the same as or similar to a standard bank card. The memory portion may be embedded within the card-shaped body, or for example the card-shaped body may comprise a movable portion comprising the memory and connector.

The SIM may be located in a removable portion of the card-shaped body. Advantageously, the removable portion when removed can be used as a miniature SIM card.

Advantageously, the memory and connector are located in a memory portion of the card-shaped body, the SIM is located in a SIM portion of the card-shaped body, and the thickness of the memory portion from the front face to the back face of the card-shaped body is greater than the thickness of the SIM portion from the front face to the back face of the card-shaped body. This allows the SIM portion to be slim enough to fit into a slot on a device such as a satellite television decoder box, while allowing the memory portion to be thicker so as to allow space for the memory and USB connector. The SIM portion may be less than 0.95 mm in thickness. Alternatively, the SIM portion may be less than 0.76 mm in thickness. Alternatively the card-shaped body may be of uniform thickness throughout. The card-shaped body may then be less than 0.95 mm in thickness, or less than 0.76 mm in thickness.

Advantageously, the connector is a universal serial bus (USB) type connector.

Advantageously, there is stored in the memory data relating to and/or a computer application which provides functions relating to the use of the SIM.

In accordance with the present invention there is further provided a data storage device comprising: a card-shaped body, a memory within the card-shaped body, a connector for connecting the memory to a personal computer, wherein the card-shaped body comprises a swipable portion with a magnetic stripe arranged to be read by a magnetic stripe card reader.

The card-shaped body may have dimensions the same as or similar to a standard bank card. The memory portion may be embedded within the card-shaped body, or for example the card-shaped body may comprise a movable portion comprising the memory and connector.

Advantageously, the memory and connector are located in a memory portion of the card-shaped body, and the thickness of the memory portion from the front face to the back face of the card-shaped body is greater than the thickness of the swipable portion from the front face to the back face of the card-shaped body. This allows the swipable portion to be sufficiently thin to be used in standard existing card readers, while allowing the memory portion to be thicker so as to allow space for the memory and USB connector. The swipable portion may be less than 0.95 mm in thickness. Alternatively, the swipable portion may be less than 0.76 mm in thickness. Alternatively the card-shaped body may be of uniform thickness throughout. The card-shaped body may then be less than 0.95 mm in thickness, or less than 0.76 mm in thickness.

The data storage device may further comprise a radio-frequency identification (RFID) transponder.

Advantageously, the connector is a universal serial bus (USB) type connector.

Advantageously, there is stored in the memory data relating to and/or a computer application which provides functions relating to the use of the magnetic stripe.

In accordance with the present invention there is further provided a data storage device comprising: a card-shaped body, a memory within the card-shaped body, a connector for connecting the memory to a personal computer, wherein the card-shaped body comprises a radio-frequency identification (RFID) transponder.

Advantageously, the connector is a universal serial bus (USB) type connector.

Advantageously, there is stored in the memory data relating to and/or a computer application which provides functions relating to the use of the RFID transponder.

In accordance with the present invention there is further provided a data storage device comprising: a card-shaped body, a memory disposed within the card-shaped body, a connector for connecting the memory to a personal computer, wherein the card-shaped body comprises a pharmaceutical storage portion comprising one or more removable pharmaceutical products and/or medical devices.

The card-shaped body may have dimensions the same as or similar to a standard bank card. The memory portion may be embedded within the card-shaped body, or for example the card-shaped body may comprise a movable portion comprising the memory and connector.

The storage portion may comprise a plastics sheet with a foil backing comprising pharmaceutical products, and the pharmaceutical products may be stored within pockets formed between the plastics sheet and the foil backing. The storage portion may comprise a pocket formed in the card-shaped body, and the plastics sheet may be disposed within the pocket. Alternatively, other particular storage methods may be used as appropriate for particular pharmaceutical products, or for particular medical devices.

Advantageously, the data storage device further comprises a leaflet portion comprising printed information. The leaflet portion may be hingably mounted on the card-shaped body. The leaflet portion may comprise a pocket, and the printed information is printed on a leaflet removably located within the pocket. Alternatively, the printed information may be printed onto the surface of a portion fixed to the card-shaped body itself.

Advantageously, the connector is a universal serial bus (USB) type connector.

Advantageously, there is stored in the memory data relating to and/or a computer application which provides functions relating to the use of the pharmaceutical products and/or medical devices.

There will now be described embodiments of the invention, with reference to the accompanying drawings of which:

FIG. 1a shows a known USB card;

FIG. 1b shows the USB memory card of FIG. 1a with its USB connector available to be used;

FIG. 4a shows a USB card in accordance with a further embodiment of the present invention;

FIG. 4b shows the USB card of FIG. 4a with its USB connector available to be used;

FIG. 5 shows a USB card in accordance with a further embodiment of the present invention;

Figure 2A:
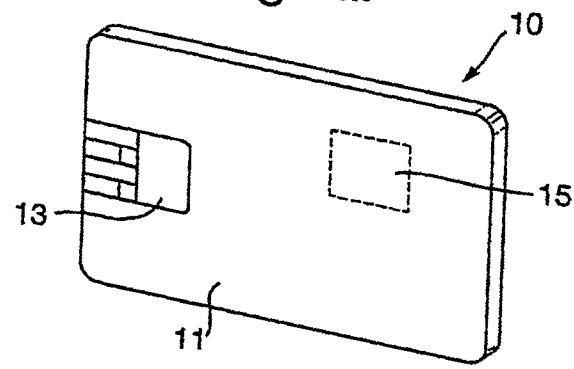
FIG. 2a shows another known USB card.
Figure 2B:
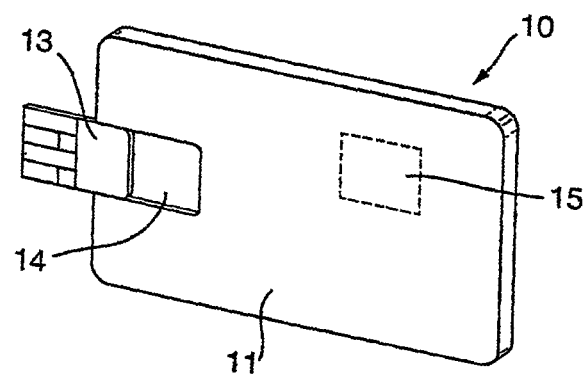
FIG. 2b shows the USB card of FIG. 2a with its USB connector available to be used.
Figure 3A:
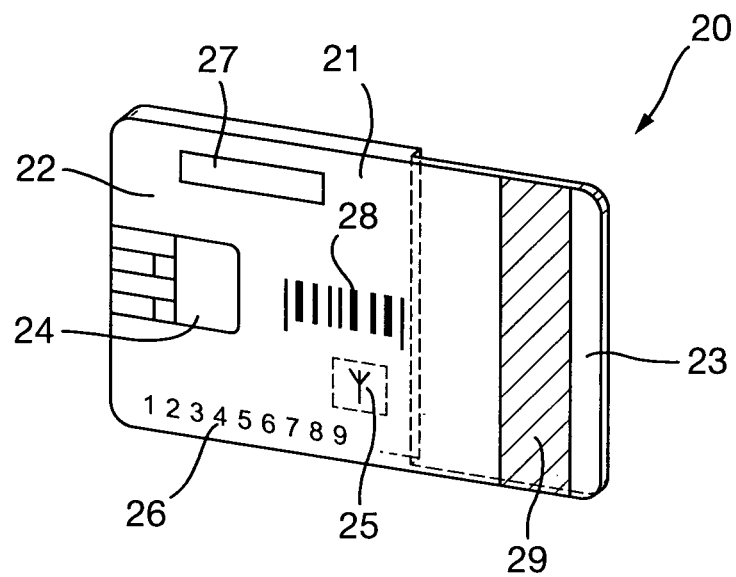
FIG. 3a shows a USB card in accordance with an embodiment of the present invention.

A USB card 20 in accordance with an embodiment of the present invention is shown in FIG. 3a. The USB card 20 comprises a card-shaped body 21, which is divided along the shorter axis of its face into a first, thicker portion 22 and a second, thinner portion 23.

The thicker portion 22 of the card-shaped body 21 comprises a slidable USB connector 24 connected to flash memory (not shown) contained within the thicker portion 22. The thicker portion 22 further comprises a radio-frequency identification (RFID) transponder 25.

The thinner portion 23 of the card-shaped body 21 comprises a magnetic stripe 29 as found on a standard bank card. The thinner portion 23 of the card-shaped body 21 is thin enough to be swiped through a standard bank card reader, and the magnetic stripe 29 is positioned on the thinner portion 23 in the appropriate position to be read by the reader when the card is swiped in such a way.

In addition to the magnetic stripe, a card may incorporate an integrated circuit (IC) such as are commonly found on "chip and PIN" bank cards. Such a card may be known as an integrated circuit card (ICC), smart card or chip card; such cards are usually defined to be any pocket-sized card with embedded integrated circuits which can receive, process and output information. There are two broad categories of ICCs: memory cards, which contain only non-volatile memory storage components (and perhaps some specific security logic), and microprocessor cards, which contain volatile memory and microprocessor components.

"Contact" smart cards have a contact area, comprised of several gold-plated contact pads, with dimensions of about 1 cm by 1 cm. When inserted into a reader, the chip makes contact with electrical connectors in the reader via the contact area, allowing the reader to read information from the chip and write information back.

Contact smart card are defined by standards such as the ISO/IEC 7816 and ISO/IEC 7810 series, which define amongst other things the physical shape, the positions and shapes of the electrical connectors, the electrical characteristics, the communications protocols (including the format of the commands sent to the card and the responses returned by the card), the robustness of the card, and the functionality of the chip. The cards do not contain batteries; energy is supplied by the card reader.

The face of the card-shaped body 21 is printed with a human readable code 26, a bar code 28, and "scratch field" 27. (A scratch field is a piece of information printed onto the card which is covered with an opaque material that can be scratched off, for example with a coin or fingernail, to reveal the information beneath. A scratch field is used to provide information (such as a PIN) in such a way that the information cannot be read without leaving evidence that that has occurred. (The evidence being that at least a part of the scratch field has been removed.) The scratch field can be either a self-adhesive scratch label which has been applied on top of the information or a scratch foil which has been applied with a heated stamp tool (hotstamp).)

In the present example the human readable code 26, bar code 28 and scratch field 27 are printed on the same side of the card-shaped body 21 as the magnetic strip 29, but one or more of them could alternatively be printed on the reverse side of the card-shaped body 21.

The USB card 20 may be made of any suitable material, such as a plastics material.

Figure 3B:
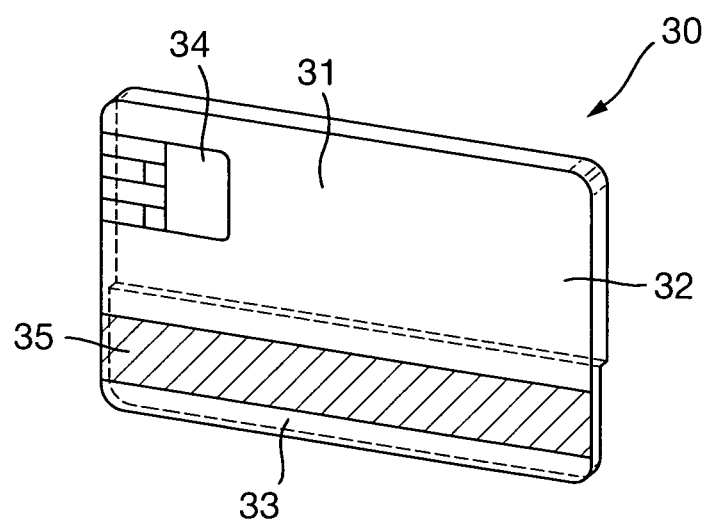
FIG. 3b shows a USB card in accordance with a further embodiment of the present invention.

A similar USB card 30 in accordance with a further embodiment of the present invention is shown in FIG. 3b. In this embodiment, however, the card-shaped body 31 of the USB card 30 is divided along the longer axis of its face into the first, thicker portion 32 and the second, thinner portion 33. The thicker portion 32 of the card-shaped body 31 again comprises a slidable USB connector 34 connected to flash memory (not shown) contained within the thicker portion 32, and the thinner portion 33 again comprises a magnetic stripe 35. The thinner portion 33 of the card-shaped body 31 is again thin enough to allow the thinner portion 23 to be swiped through a standard bank card reader, with the magnetic stripe 35 again being positioned appropriately.

The flash memory of the USB card 20 or USB card 30 can have installed upon it a computer application or data relating to the use of the card. For example, the card may be a "loyalty" card, which allows a user to collect points when they shop at certain stores, the points entitling them to benefits such as money off future purchases. The card could then contain an application that allows the user to access details of the points they have collected, for example by downloading that information from the issuer of the card via the Internet. Another example would be if the card was a gift card, representing an amount of money that could be exchanged for goods at a particular shop. The memory could then contain a catalogue (for example in PDF format) of goods available from that shop.

A USB card 40 in accordance with a further embodiment of the present invention is shown in FIGS. 4a and 4b. As in the previous embodiments the USB card 40 comprises a card-shaped body 41 with a USB connector 42 connected to flash memory (not shown) contained within the card-shaped body 41. In the present embodiment the USB connector 42 can be rotated around an axis parallel to the edge card-shaped body 41 on which the USB connector 42 is mounted between a closed position (see FIG. 4a) and an opened position (see FIG. 4b).

The USB card 40 further comprises a radio-frequency identification (RFID) transponder 43 embedded within the card-shaped body 41. Cards incorporating RFID transponders are sometimes known "contactless" cards, as they do not require contact in order to transmit data. The RFID transponder comprises a chip on which data is stored and an antenna. A card reader transmits a radio frequency signal, and when this is received by a transponder it responds by transmitting the data stored upon it, again using a radio frequency signal.

The transponder may be powered by a battery, or from the radio frequency signal transmitted by the reader. As well as being embedded within cards, RFID transponders may be incorporated into a sticker that is applied to a card. There are two common types of data transfer: low frequency transfer with 125 KHz and high frequency transfer with 13.56 MHz (a proposed further type is 800/900 MHz and 2.45 GHz).

In this further embodiment, the USB card 40 could for example be used as a travel card (in other words as an electronic ticket allowing the user to travel on public transport), and the flash memory could have stored upon it data relating to travel such as maps and/or timetables, or computer applications such as interactive maps and/or timetables, route planners and the like.

A USB card 50 in accordance with a further embodiment of the present invention is shown in FIG. 5. As in the previous embodiments the USB card 50 comprises a card-shaped body 51 with a USB connector 52 connected to flash memory (not shown) contained within the card-shaped body 51.

A SIM portion 53 of the card-shaped body 51 comprises a SIM (subscriber identification module) 55, as used in (for example) a mobile phone. An area 54 of the card-shaped body 51 around the perimeter of the SIM portion 53 has been removed, so that the SIM portion 53 is attached to the rest of the card-shaped body 51 by only two small pieces of body 56. This allows the SIM portion 53 to be easily detached from the rest of the card-shaped body 51. Once removed, the SIM portion 53 can (for example) be installed in a mobile phone.

A SIM is part of a removable smart card ICC (Integrated Circuit Card), also known as a SIM card, which can be used for mobile telephony devices (such as computers) and mobile phones. A SIM card securely stores a service-subscriber key (IMSI) used to identify a subscriber for a particular service. A SIM card allows a subscriber to change the device they are using for the service by simply removing the SIM card from device and inserting it into another device.

SIM cards are available in two standard sizes. The first has the dimensions of a standard bank card (85.60 mm by 53.98 mm by 0.76 mm). A newer, more popular miniature version (known as a "miniature SIM card") has dimensions of 25 mm by 15 mm by 0.76 mm. However, most SIM cards are supplied as a full-sized card with a miniature SIM card held in place by a few plastic links which can be easily broken off so that the miniature SIM card can be used alone, as in the present embodiment.

Figure 6A:
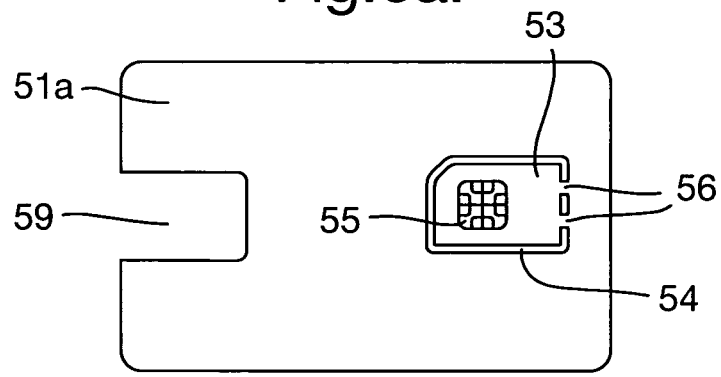
FIGS. 6a to 6c show three parts forming the USB card of FIG. 5.
Figure 6B:
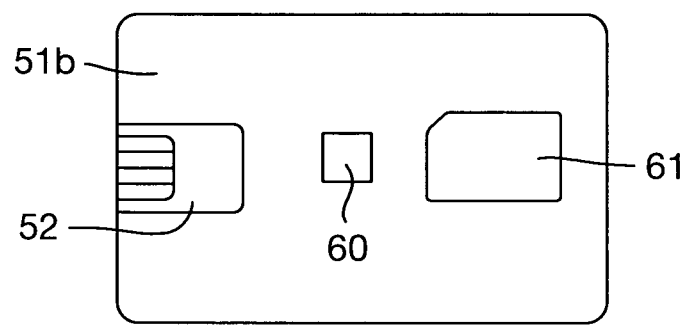
Figure 6C:
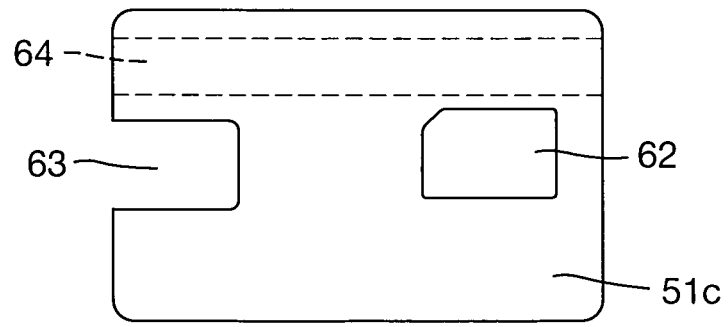

The card-shaped body 51 of the USB card 50 is made up of three card-shaped parts 51a, 51b and 51c, as shown in FIGS. 6a to 6c.

FIG. 6a shows the first card-shaped part 51a, which comprises the SIM portion 53 with SIM 55, removed area 54 and two small pieces. The first card-shaped part 51a has a recess 59 cut out of its edge, the position and dimension of which match that of the USB connector 52 when the USB card 50 is assembled.

FIG. 6b shows the second card-shaped part 51b, which is mounted underneath the first card-shaped part 51a. The second card-shaped part 51b comprises the USB connector 52 and flash memory 60. The second card-shaped part 51b has a hole 61, the position and dimension of which match that of SIM portion 53 when the USB card 50 is assembled.

FIG. 6c shows the third card-shaped part 51c, which is mounted underneath the second card-shaped part 51c. The second card-shaped part 51b has a recess 63 cut out of its edge similarly to the recess 59 of the first card-shaped part 51a, and a hole 62 similarly to the hole 62 of the second card-shaped part 51b. The third card-shaped part 51c may also have a magnetic stripe 64 on its outer face, in other words the face which is not mounted on the second card-shaped part 51b.

When assembled, the recesses 59 and 63 align with the USB connector 52, allowing the USB connector 52 to move freely, and the holes 61 and 62 align with the SIM portion 53, allowing the SIM portion 53 to be easily detached from the rest of the USB card 50.

In this embodiment, the flash memory could have installed upon it computer applications relating to the mobile device in which the SIM portion 53 is to be installed. For example, it is common for a mobile phone to have an associated suite of computer applications which allow the data upon it to be updated and backed up, and new applications to be installed upon the mobile phone, and these could be stored upon the flash memory. Alternatively or additionally there could be stored a computer application or applications that allow a user to see the details of their account with the company providing the related mobile phone services, for example by downloading the relevant information via the Internet.

As well as being used in devices such as mobile phones, SIMs can also be used to control access to subscriber services such as satellite or cable television. A USB card in accordance with a further embodiment of the present invention comprises a card-shaped body with a thinner portion comprising the SIM card, dimensioned so as to be insertable into a slot in for example a satellite or cable television signal decoder device, and a thicker portion comprising the flash memory and USB connector. In this case the memory card may have stored upon it computer applications or data relating to the television service, such as an application to download television listings information from the Internet, for example.

Figure 7A:
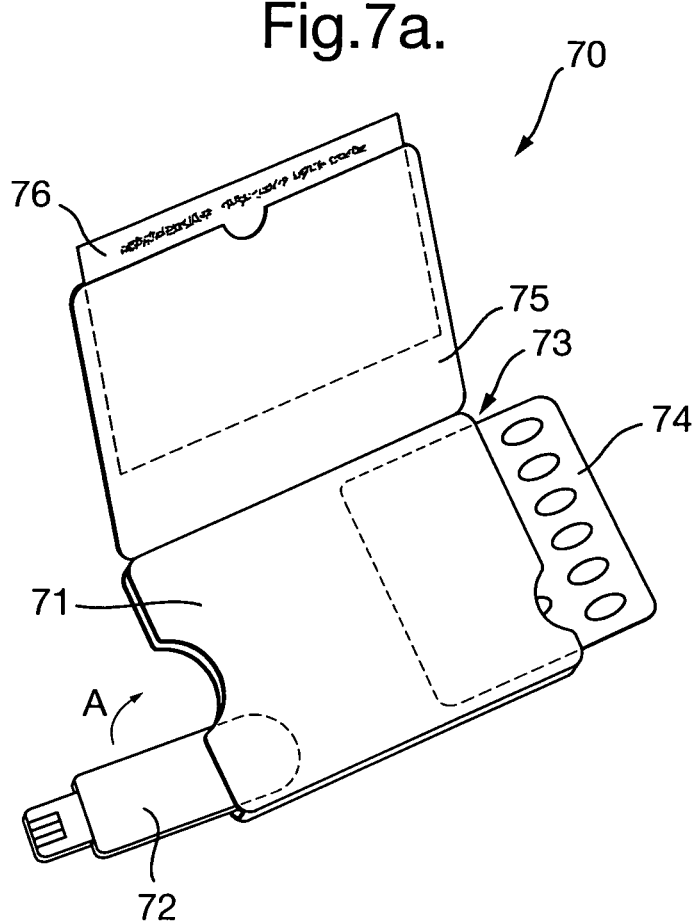
FIG. 7a shows a USB card in accordance with a further embodiment of the present invention.
Figure 7B:
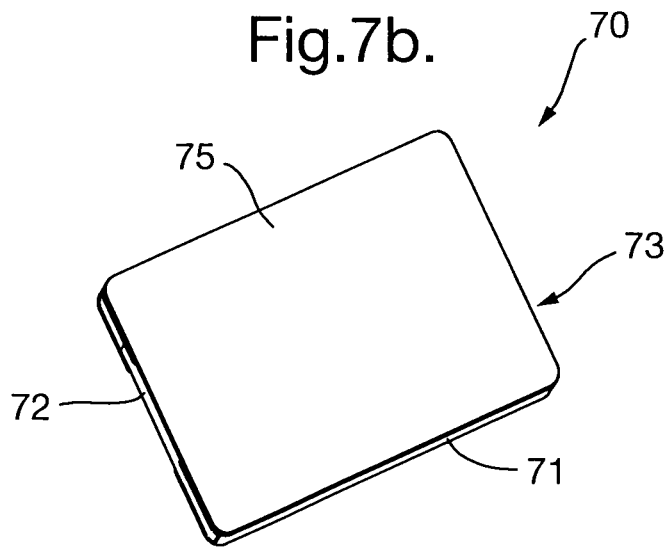
FIG. 7b shows the USB card of FIG. 7a in a closed configuration.

A USB card 70 in accordance with a further embodiment of the present invention is shown in FIGS. 7a and 7b. As in the previous embodiments the USB card 70 comprises a card-shaped body 71 with a USB connector 72 connected to flash memory (not shown) contained within the card-shaped body 71. In the present embodiment the USB connector 72 can be rotated around an axis perpendicular to the face of the card-shaped body 71 between an open position (see FIG. 7a) and a closed position (see FIG. 7b and arrow "A") where the USB connector 72 is located within the card-shaped body 71.

The edge of the card-shaped body 71 opposite that on which the USB connector 72 is mounted comprises an opening 73 in which a pharmaceuticals sheet 74 is removably located. The pharmaceuticals sheet 74 consists of a plastic sheet with a foil backing, with pharmaceutical capsules stored within pockets formed between the plastic sheet and the foil backing. (This arrangement is known as a "blister pack"; the capsules are removed by pressing the plastic sheet so that they are forced through the foil backing.)

On a long edge of the card-shaped body 71 there is hingably mounted a leaflet portion 75, which comprises a pocket in which leaflet 76 containing printed information relating to the pharmaceutical is removably located. The leaflet could comprise a single card, a folded sheet of paper, a small booklet, or any other suitable item. The leaflet may be an authorised Patient Information Leaflet (PIL), as regulated in the UK by the Medicines and Healthcare products Regulatory Agency (MHRA).

The USB card 70 could be made of any suitable material, such as a plastics material, plastic-coated paper or card.

In this embodiment, the flash memory could have installed upon it more detailed data relating to the pharmaceuticals, for example details of dosage information, possible side-effects or the like. The flash memory could alternatively or additionally have installed upon it computer applications relating to the pharmaceuticals, for example applications that allow a treatment plan to be generated based on input data, applications that allows a course of treatment to be tracked, and/or applications that provide a reminder system for taking the pharmaceuticals.

The present embodiment could comprise pharmaceutical products such as pills, capsules, medicated chewing gum and the like, or similarly medical devices such as syringes, condoms, disposable thermometers and the like.

Different arrangements for the USB connector have been described in the different embodiments of the present invention, but it will be apparent that any suitable arrangement for the USB connector, and other suitable connectors other than USB connectors (such as serial, parallel or "Firewire" connectors), could be used for the different embodiments of the present invention.

Figure 8A:
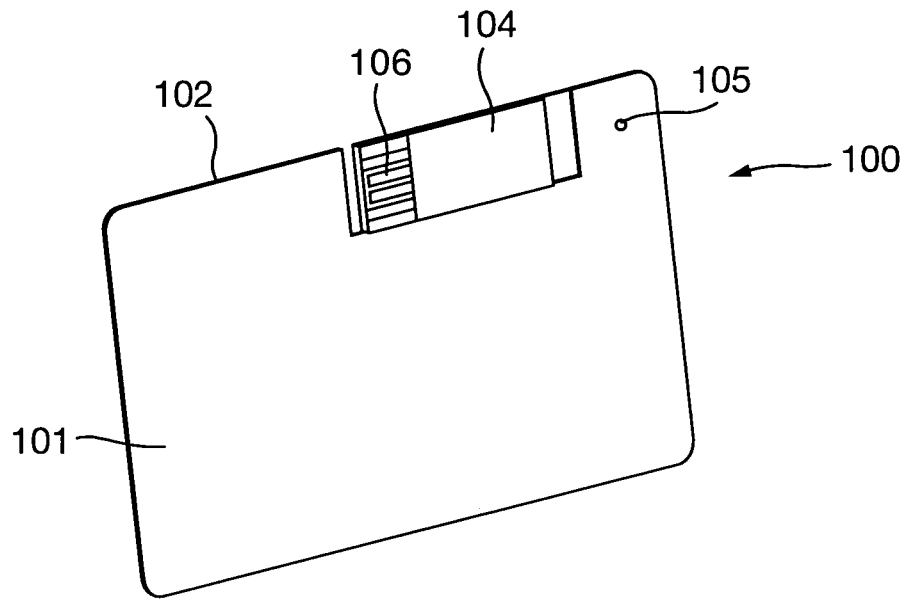
FIGS. 8a and 8b show a USB card in accordance with a further embodiment of the present invention.
Figure 8B:
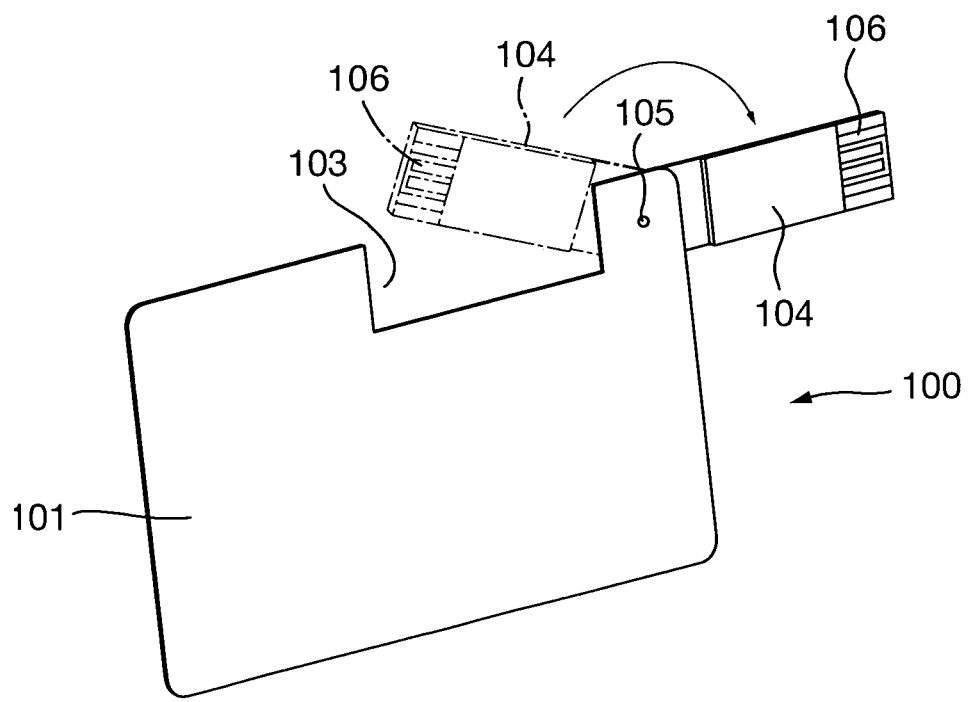

FIGS. 8a and 8b show a USB card 100 in accordance with a further embodiment of the present invention. The USB card 100 comprises a main portion 101. On a longer edge 102 of the main portion 101 there is a cut-away recess 103. A connector portion 104 is rotatably mounted by means of a hinge 105 on the main portion 101. The hinge is located adjacent to the recess 103, at a corner of the main portion 101.

The connector portion 104 has on the opposite end from the hinged end a USB connector 106, which is connected to a memory (not shown) housed within the connector portion 104. The connector portion 104 is dimensioned so that in a closed position (see FIG. 8a) it is located with the recess 103, with the outward-facing edge of the connector portion 104 flush with the edge 102 of the body portion 101. The connecter portion 104 can be rotated using the hinge 105 from the closed position to an open position (see FIG. 8b), in which the USB connector 106 of the connector portion 104 is available to be inserted into a USB port, to enable to memory to be accessed.

The part of the connector portion 104 containing the memory is thicker than a standard bank card, due to the space required for the memory. However, as the main portion 101 does not contain the memory, the main portion can be only the thickness of a standard bank card throughout.

Figure 9A:
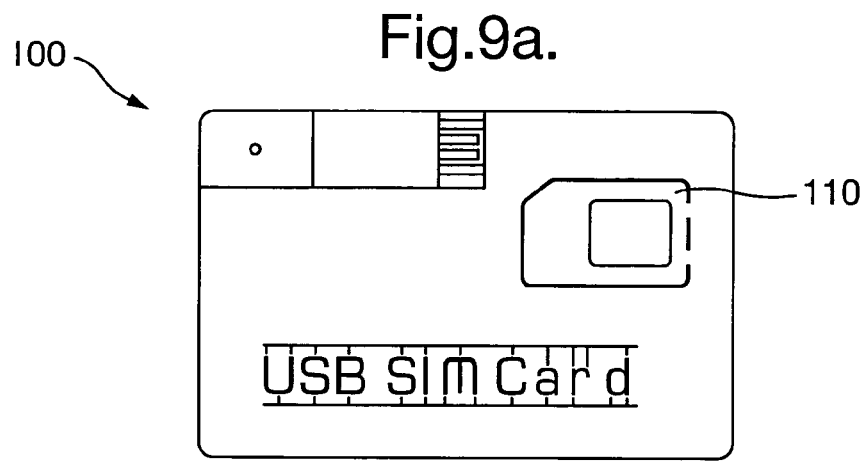
FIGS. 9a to 9e show USB cards in accordance with further embodiments of the present invention.
Figure 9B:
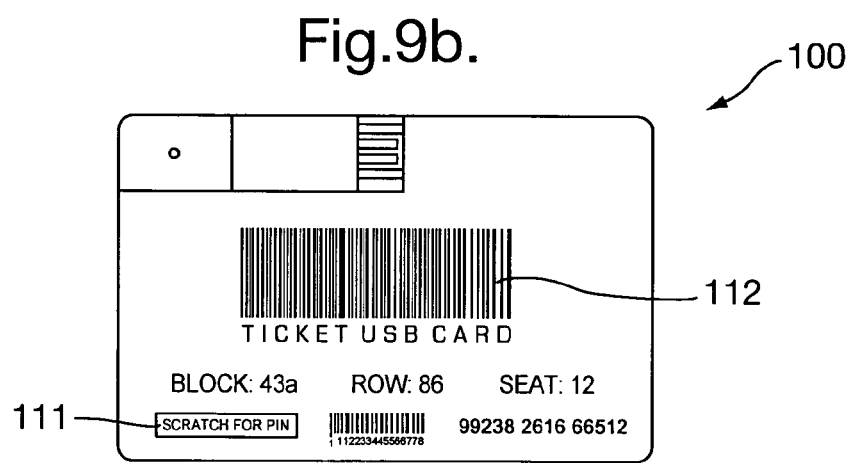
Figure 9C:
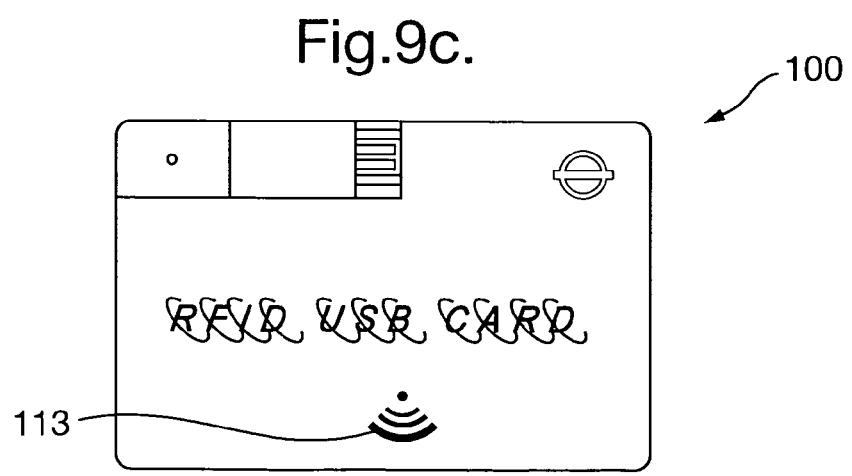
Figure 9D:
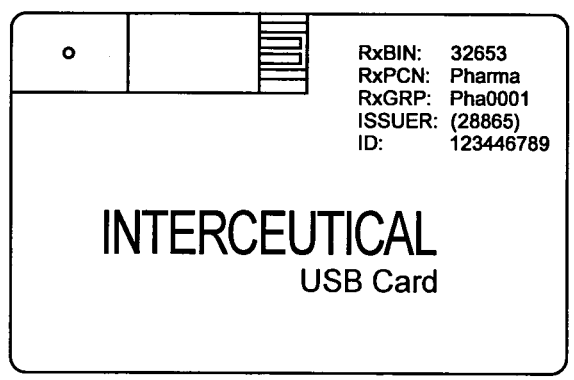
Figure 9E:

It will be appreciated that this embodiment can be combined with features of the other embodiments described herein, to give for example cards with SIM portion 110 (FIG. 9a), scratch field 111 and bar code 112 (FIG. 9b), RFID transponder 113 (FIG. 9c), magnetic stripe 114 (FIG. 9e). The card may also be combined with features of the embodiment of FIGS. 7a and 7b, to give a card that can be combined with pharmaceutical information sheets and/or capsules (FIG. 9d).

It is an advantage of this arrangement of the main portion and connector portion of the USB card that the recess can only extend approximately half-way along the edge 102 of the USB card, as this means that a large area of the card extending from the short edge opposite the edge where the connector portion is hinged can be only the thickness of a standard bank card, allowing it to be inserted into a standard "Chip and PIN" card reader, for example. Further, a large area of the card extending from the longer edge opposite the edge 102 can also be only the thickness of a standard bank card, allowing it to be swiped through a standard magnetic card reader, for example.

The invention claimed is:

1. A data storage device comprising:
a card-shaped body;
a memory within the card-shaped body;
a connector for connecting the memory to a personal computer;
wherein the card-shaped body comprises a subscriber identity module (SIM); and
wherein the memory and connector are located in a memory portion of the card-shaped body, the SIM is located in a SIM portion of the card-shaped body, and wherein the thickness of the memory portion from the front face to the back face of the card-shaped body is greater than the thickness of the SIM portion from the front face to the back face of the card-shaped body.

2. The data storage device as claimed in claim 1, wherein the SIM is located in a removable portion of the card-shaped body.

3. The data storage device as claimed in claim 1, wherein the removable portion when removed can be used as a miniature SIM card.

4. The data storage device as claimed in claim 1, wherein the connector is a universal serial bus (USB) type connector.

5. The data storage device as claimed in claim 1, wherein there is stored in the memory data relating to and/or a computer application which provides functions relating to the use of the SIM.

6. A data storage device comprising:
- a card-shaped body;
- a memory disposed within the card-shaped body;
- a connector for connecting the memory to a personal computer;
- wherein the card-shaped body comprises a pharmaceutical storage portion comprising one or more removable pharmaceutical products and/or medical devices;
- wherein the storage portion comprises a plastics sheet with a foil backing comprising pharmaceutical products, and the pharmaceutical products are stored within pockets formed between the plastics sheet and the foil backing; and
- wherein the storage portion comprises a pocket formed in the card-shaped body, and the plastics sheet is disposed within the pocket.

7. The data storage device as claimed in claim 6, wherein the connector is a universal serial bus (USB) type connector.

8. The data storage device as claimed in claim 6, wherein there is stored in the memory data relating to and/or a computer application which provides functions relating to the use of the pharmaceutical products and/or medical devices.

9. The data storage device as claimed in claim 6, wherein the card-shaped body comprises:
- a main portion comprising a recess;
- a connector portion comprising the memory and connector; and
- wherein the connector portion is hingably mounted on the main portion to be rotatable between a closed position in which the connector portion is located within the recess, and an open position in which the connector of the connector portion is located outside of the recess so that it can be used to connect the memory to a personal computer.

10. The data storage device as claimed in claim 9, wherein the connector portion is hingably mounted at a corner of the main portion.

11. A data storage device comprising:
- a card-shaped body;
- a memory disposed within the card-shaped body;
- a connector for connecting the memory to a personal computer;
- wherein the card-shaped body comprises a pharmaceutical storage portion comprising one or more removable pharmaceutical products and/or medical devices;
- wherein the storage portion comprises a plastics sheet with a foil backing comprising pharmaceutical products, and the pharmaceutical products are stored within pockets formed between the plastics sheet and the foil backing; and
- a leaflet portion comprising printed information.

12. The data storage device as claimed in claim 11, wherein the leaflet portion is hingably mounted on the card-shaped body.

13. The data storage device as claimed in claim 11, wherein the leaflet portion comprises a pocket, and the printed information is printed on a leaflet removably located within the pocket.

14. The data storage device as claimed in claim 11, wherein the connector is a universal serial bus (USB) type connector.

15. The data storage device as claimed in claim 11, wherein there is stored in the memory data relating to and/or a computer application which provides functions relating to the use of the pharmaceutical products and/or medical devices.

16. The data storage device as claimed in claim 11, wherein the card-shaped body comprises:
- a main portion comprising a recess;
- a connector portion comprising the memory and connector; and
- wherein the connector portion is hingably mounted on the main portion to be rotatable between a closed position in which the connector portion is located within the recess, and an open position in which the connector of the connector portion is located outside of the recess so that it can be used to connect the memory to a personal computer.

17. The data storage device as claimed in claim 16, wherein the connector portion is hingably mounted at a corner of the main portion.

* * * * *

UNITED STATES PATENT AND TRADEMARK OFFICE
CERTIFICATE OF CORRECTION

PATENT NO. : 8,670,242 B2
APPLICATION NO. : 13/054308
DATED : March 11, 2014
INVENTOR(S) : Ellul et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 538 days.

Signed and Sealed this

Twenty-ninth Day of September, 2015

Michelle K. Lee
*Director of the United States Patent and Trademark Office*